United States Patent
Nouwens et al.

(10) Patent No.: US 9,056,657 B2
(45) Date of Patent: Jun. 16, 2015

(54) OFFSHORE VESSEL FOR LAYING A PIPELINE ON THE SEABED, AND A METHOD FOR HANDLING PIPE SECTIONS

(75) Inventors: Ronny Lambertus Waltherus Nouwens, Schiedam (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 13/497,762

(22) PCT Filed: Sep. 21, 2010

(86) PCT No.: PCT/NL2010/050615
§ 371 (c)(1),
(2), (4) Date: Jun. 1, 2012

(87) PCT Pub. No.: WO2011/037459
PCT Pub. Date: Mar. 31, 2011

(65) Prior Publication Data
US 2012/0237301 A1     Sep. 20, 2012

(30) Foreign Application Priority Data
Sep. 23, 2009   (NL) ..................................... 2003530

(51) Int. Cl.
*F16L 1/12* (2006.01)
*B63B 35/03* (2006.01)

(52) U.S. Cl.
CPC ....................... *B63B 35/03* (2013.01)

(58) Field of Classification Search
CPC ...................................................... B63B 35/03
USPC ................ 405/158, 166, 168.1, 169, 170
See application file for complete search history.

(56) References Cited

U.S. PATENT DOCUMENTS

| 4,486,123 | A | * | 12/1984 | Koch et al. | 405/169 |
|---|---|---|---|---|---|
| 4,591,294 | A | * | 5/1986 | Foulkes | 405/170 |
| 4,984,934 | A | * | 1/1991 | Recalde | 405/168.3 |
| 5,044,825 | A | * | 9/1991 | Kaldenbach | 405/166 |
| 5,413,434 | A | * | 5/1995 | Stenfert et al. | 405/166 |

(Continued)

FOREIGN PATENT DOCUMENTS

| EP | 0 262 545 A1 | 4/1988 |
|---|---|---|
| GB | 2 095 787 A | 10/1982 |

(Continued)

*Primary Examiner* — Doug Hutton, Jr.
*Assistant Examiner* — Patrick Lambe
(74) *Attorney, Agent, or Firm* — Birch, Stewart, Kolasch & Birch, LLP

(57) ABSTRACT

An offshore pipelaying vessel for laying a pipeline on a seabed includes a pipeline-laying installation having a preassembly line; an inspection station; an assembly line with a pipeline assembly station to assemble a pipeline to be launched from the vessel by joining multi and/or single length pipe sections end to end; and a conveyor system for transporting multi and single length pipe sections, said conveyor system comprising an entry-and-exit location, wherein the conveyor system is configured to allow transportation of multi and/or single length pipe sections at least along the following routes: directly from the entry-and-exit location to the assembly line; indirectly from the entry-and-exit location to the assembly line via the preassembly line and said inspection station; and from the entry-and-exit location to the preassembly line and said inspection station, and after passing said inspection station directly to the entry-and-exit location.

17 Claims, 4 Drawing Sheets

(56) References Cited

U.S. PATENT DOCUMENTS

| | | | |
|---|---|---|---|
| 6,056,478 A * | 5/2000 | Martin et al. | 405/168.3 |
| 6,524,030 B1 * | 2/2003 | Giovannini et al. | 405/166 |
| 2003/0044235 A1 * | 3/2003 | Stockstill | 405/154.1 |
| 2003/0091395 A1 * | 5/2003 | Stockstill | 405/154.1 |
| 2003/0219313 A1 * | 11/2003 | Giovannini et al. | 405/158 |
| 2010/0080657 A1 * | 4/2010 | Bianchi | 405/168.3 |
| 2010/0104371 A1 * | 4/2010 | Scaini et al. | 405/166 |
| 2011/0036287 A1 * | 2/2011 | Wijning et al. | 114/74 R |
| 2011/0182671 A1 * | 7/2011 | Roodenburg et al. | 405/166 |

FOREIGN PATENT DOCUMENTS

| | | |
|---|---|---|
| WO | WO 96/27751 A1 | 9/1996 |
| WO | WO 00/05525 A2 | 2/2000 |
| WO | WO 2008/107186 A1 | 9/2008 |
| WO | WO 2009/102196 A2 | 8/2009 |

* cited by examiner

OFFSHORE VESSEL FOR LAYING A PIPELINE ON THE SEABED, AND A METHOD FOR HANDLING PIPE SECTIONS

The invention relates to an offshore pipelaying vessel for laying a pipeline on a seabed according to the preamble of claim 1.

Such pipelaying vessels are known, for instance in the form of S-lay pipelaying vessels or J-lay pipelaying vessels. Pipe sections, i.e. single length pipe sections, may be supplied from a pipe section storage, which may be located on the vessel, e.g. on a supply deck. The supply deck may be an open, non-covered main deck of the vessel. However, the pipe section storage may also be situated on a separate supply vessel, wherein for instance a crane transports pipe sections from the supply vessel to the pipelaying vessel and subsequently to the entry-and-exit location.

The preassembly line is preferably joining pipe sections in a horizontal orientation. Depending on the pipelaying principle, the assembly line may form a pipeline in a generally horizontal orientation (e.g. S-lay) or in a generally vertical orientation (e.g. J-lay). In case of the latter, the conveyor system is provided with a device to bring multi length pipe sections from the horizontal orientation in the preassembly line to the vertical orientation in the assembly line.

A problem in the known pipelaying vessels is that the handling of pipe sections on the pipelaying vessel is not entirely satisfactory.

It is therefore an object of the invention to provide an improved vessel, which in particular allows an efficient and versatile handling of pipe sections.

The invention therefore provides an offshore pipelaying vessel for laying a pipeline on a seabed according to the preamble of claim 1, characterized in that the conveyor system is configured to allow transportation of multi and/or single length pipe sections along at least the following routes:
  directly from the entry-and-exit location to the assembly line;
  indirectly from the entry-and-exit location to the assembly line via the preassembly line and said inspection station;
  from the entry-and-exit location to the preassembly line and said inspection station, and after passing said inspection station directly to the entry-and-exit location.

An advantage of the vessel according to the invention is that it allows two supply routes to the assembly line which are both efficient. In normal operation, the pipe sections will be transported from the pipe section storage to the assembly line indirectly via the preassembly line and associated inspection station. By joining pipe sections together in the preassembly line to form multi length pipe sections, for instance doubles, triples, quadruples, etc., the pipeline to be launched can be assembled much faster in the assembly line with respect to the situation in which a pipeline is formed by using single length pipe sections only.

Further, in the assembly line the pipeline may be movable over a limited axial length with respect to the vessel to compensate for reciprocal vessel motions. The pipeline assembly stations are in that case held stationary relative to the moving pipeline to perform joining actions and are thus also moving relative to the vessel within a limited axial range of the vessel. An advantage of the preassembly line is that the number of pipeline assembly stations joining pipe sections together in the assembly line can be reduced thereby simplifying the assembly process and design of the assembly line. Also, in the preassembly line, the one or more joining station are preferably mounted at a stationary location on the deck.

However, in some cases, it is desired to form the pipeline using single length pipe sections only. With the vessel according to the invention, single length pipe sections can be transported to the assembly line directly and thus bypass the preassembly line, resulting in an efficient and versatile transportation, i.e. handling of pipe sections.

Another advantage of the vessel according to the invention, is that multi length pipe sections, which are rejected by the inspection station, e.g. due to weld quality, are able to return directly to the entry-and-exit location with minimal interference of the transportation process. There is thus no need to store the rejected multi length pipe sections near the inspection station, or a complex transportation to the entry-and-exit location such as back through the preassembly line.

In an embodiment, the preassembly line, inspection station, and the assembly line are located on a working deck, and the pipe sections are stored on a supply deck above or below the working deck. In that case a pipe elevator is provided for transporting a multi or single length pipe section in a generally vertical direction between the supply deck and the working deck, wherein the pipe elevator is the entry-and-exit location.

The supply deck may be an open, non-covered main deck of the vessel, which is in particular suitable for S-lay pipelaying vessels. It is also possible that the working deck is the main deck of the vessel and the pipe sections are supplied from a supply deck below the main deck. This may be suitable for a J-lay pipelaying vessel. In another variant, the working deck may be located below the main deck and the supply deck is located below the working deck. An advantage of storing the pipe sections below the working deck is that the centre of gravity of the vessel can be lowered resulting in a more stable behaviour of the vessel.

An advantage of providing both the preassembly line, inspection station, and the assembly line on one deck, is that space is used efficient. All working stations such as joining, assembly, and inspecting stations are then located on one deck, while keeping other decks such as the main deck and/or supply deck free for storing pipe section.

Preferably, the entry-and-exit location is located near a beginning of the assembly line. This keeps the direct route from the entry-and exit location to the assembly line as short as possible, thereby saving a lot of time when this route is used. In case a pipe elevator is used between the working deck and the main deck, it also leaves one side of the main deck free, for instance for providing a pipe section storage at said side of the main deck which can easily be accessed by hoisting cranes for filling the pipe section storage with pipe sections.

In another embodiment, a disconnecting station is provided downstream of the inspection station between the inspection station and the pipe section storage, preferably between the inspection station and the entry-and-exit location, for disconnecting multi length pipe section into single length pipe sections.

When single length pipe sections are joined together in the joining station of the preassembly line and the joints are rejected by the inspection station, it can be convenient to disconnect the multi length pipe sections prior to the return to the entry-and-exit location, especially when the single length pipe sections will be prepared again for another try through the preassembly line. In case a pipe elevator is used, disconnecting the multi length pipe sections may also have the advantage of using a pipe elevator which is only capable of transporting single length pipe sections, which is less costly and requires less space for the pipe elevator.

To save more space, the inspection station may be located adjacent the entry-and-exit location, and the conveyor system may be arranged to transport multi and/or single length pipe sections between the inspection station and the entry-and-exit location in a direction perpendicular to a longitudinal direction of said multi and/or single length pipe sections, i.e. by a sideways motion. An advantage is that it requires less space than positioning the inspection station and pipe elevator for instance in line with each other. Another advantage is that a disconnecting station may be positioned in between the inspection station and the entry-and-exit location using minimal space, wherein by the inspection station approved multi length pipe sections can be transported directly to the assembly line, while a rejected multi length pipe section is disconnected or transported back to the entry-and-exit location at the same time. The sideways motion thus allows passing of multi length pipe sections.

In another embodiment, the preassembly line is located adjacent and parallel to the assembly line, wherein preferably the assembly line is located in the centre of the vessel parallel to the longitudinal direction of the vessel. This allows an easy integration with the vessel, independent of its type, so that for instance no side tanks have to be penetrated.

In an embodiment, the preassembly line extends from the entry-and-exit location in a direction corresponding to a direction in which the pipeline is launched from the vessel, which is generally towards a rear of the vessel. This has the advantage that the entry-and-exit location can be placed as close to the beginning of the assembly line as possible, thereby allowing a short transportation distance for single pipe sections. It is also a way of making efficient use of the working deck area.

In another embodiment, the preassembly line comprises a first track and a second track which is adjacent and parallel to the first track, wherein the conveyor is arranged to transport multi and/or single length pipe sections from the first track to the second track in a direction perpendicular to a longitudinal direction of said multi and/or single length pipe sections, i.e. by a sideways motion. Preferably, the entry-and-exit location is located at the beginning of the first track, and more preferably, the first track is adjacent and parallel to the assembly line, thereby allowing a rectangular layout of the pipeline-laying installation on the working deck, which is advantageous as most decks of a vessel also have a rectangular layout.

Other advantages are that efficient use is made of the available space. Further, the sideways motion from first track to second track enables a working station, e.g. a joining station, to be positioned at an end of a track, for instance an internal weld tool of a joining station can be positioned at the end of a track to enter a pipe section in the longitudinal direction for internal welding. The second track is also able to pass the entry-and-exit location again towards the beginning of the assembly line, so that the travelling distance for pipe sections that have to be returned to the entry-and-exit location is as short as possible. By providing a pipe elevator at the beginning of the first track and the first track adjacent the assembly line, it is possible to provide conveyors tracks at the side of the vessel on the supply deck and a preparing station, such as a bevelling station, between the conveyor tracks and the pipe elevator, so that also efficient use of space is made on the supply deck.

Alternatively, the second track may be located adjacent the assembly line, and the first track in turn is located adjacent the second track further away from the assembly line, although this configuration is not preferred.

In an embodiment, the pipeline-laying installation is of the S-lay type. The installation may then comprise one or more tensioners to carry the weight of the pipeline to be launched and/or a stinger attached to the vessel to guide the pipeline towards the seabed as is known in the art.

In an embodiment, the vessel comprises a further preassembly line, a further inspection station associated with said further preassembly line, and a further conveyor system. The vessel then has two conveyor systems, thereby increasing the efficiency, speed and versatility of the handling process. The further conveyor system is preferably configured to allow transportation of multi and/or single length pipe sections along the following routes:
- directly from the further entry-and-exit location to the assembly line;
- indirectly from the further entry-and-exit location to the assembly line via the further preassembly line and the further inspection station;
- from the further entry-and-exit location to the further preassembly line and the further inspection station, and after passing the further inspection station directly to the further entry-and-exit location.

More preferably, the preassembly line, inspection station and conveyor system are located on one side of the assembly line, and the further preassembly line, the further inspection station, and the further conveyor system are located on the other side of the assembly line. The configuration may be symmetrical with respect to the assembly line.

The invention also relates to a method to handle pipe sections on an offshore pipelaying vessel having a preassembly line and an assembly line, preferably a vessel as described above, wherein the preassembly line is not aligned with, e.g. parallel to, the assembly line, and wherein the method comprises the following steps:
- transporting single length pipe sections from an entry-and-exit location to the preassembly line;
- joining single length pipe sections end to end in the preassembly line to form a multi length pipe section;
- transporting the multi length pipe section to an inspection station associated with the preassembly line;
- inspecting the joints of the multi length pipe section in the inspection station;

wherein in case the joints are approved by the inspection station, the multi length pipe section is transported to an assembly line to form the pipeline to be launched from a vessel, and wherein in case the joints are rejected by the inspection station, the multi length pipe section is transported directly to the entry-and-exit location.

In an embodiment, the multi length pipe section is first transported to a disconnecting station in between the inspection station and the entry-and-exit location for disconnecting the multi length pipe section into single length pipe sections, when the joints of the multi length pipe section are rejected by the inspection station.

In another embodiment, bevelling of the single length pipe sections takes place upstream of the entry-and-exit location, preferably on another deck of the vessel, more preferably the supply deck of the vessel.

The invention will now be described in an unlimited way with reference to the drawing, in which.

Figure 1:
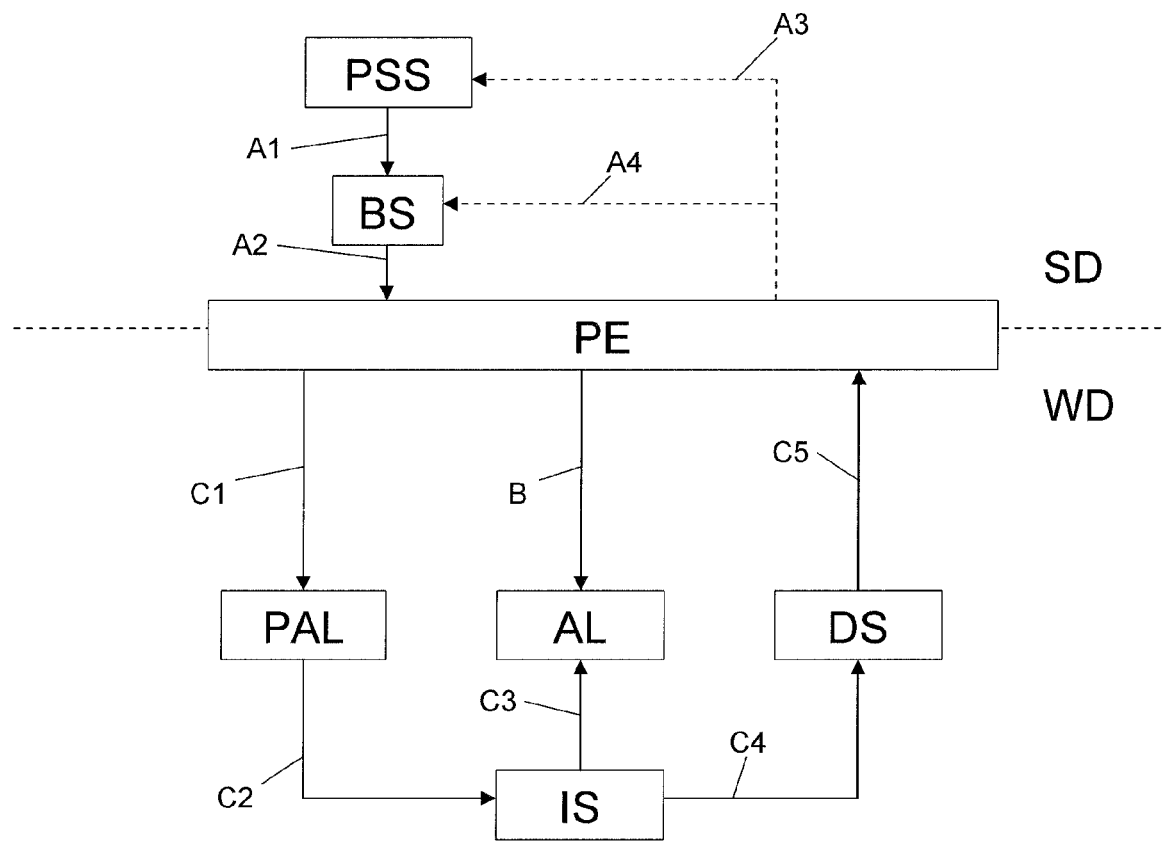
FIG. 1 shows a schematic block scheme of a pipeline-laying installation according to an embodiment of the invention.

FIG. 1 shows a schematic block scheme of a pipeline-laying installation according to an embodiment of the invention. The pipeline-laying installation comprises a preassembly line PAL for joining single length pipe sections end to end to form multi length pipe sections, an inspection station IS associated with the preassembly line PAL for inspecting joints made in the preassembly line PAL, an assembly line AL to assemble a pipeline to be launched from a vessel (not shown), and a conveyor system for transporting multi and single length pipe sections.

The conveyor system comprises an entry-and-exit location, in this example in the form of pipe elevator PE. The conveyor system is configured to allow transportation of multi and/or single length pipe sections along at least the following routes:

route B: directly from the pipe elevator PE to the assembly line AL;

route C1-C2-C3: indirectly from the pipe elevator PE to the assembly line AL via the preassembly line PAL and the inspection station IS; and route C1-C2-C4-C5: from the pipe elevator PE to the preassembly line PAL and the inspection station IS, and after passing the inspection station IS directly to the pipe elevator PE.

The preassembly line PAL comprises a joining station to form multi length pipe sections by joining single length pipe sections end to end. The inspection station IS inspects the by the joining station made joints, and when the inspection station approves a multi length pipe section, the multi length pipe section continues along route C3 to the assembly line AL. When the inspection station rejects a multi length pipe section, the multi length pipe section will return to the pipe elevator PE directly.

The preassembly line PAL, the inspection station IS, and the assembly line in this example are located on a working deck WD of the vessel. The vessel further comprises a supply deck SD from which single length pipe sections are stored in a pipe section storage PSS and supplied to the pipe elevator PE. The pipe elevator PE is thus used to transport single length pipe sections and/or multi length pipe sections between the working deck WD and the supply deck SD. The pipe elevator is thus the entry and exit location for the pipe sections on the working deck WD, and is preferably only capable of transporting single length pipe sections.

When the pipe elevator PE is only capable of transporting single length pipe sections, a disconnecting station DS is provided downstream of the inspection station, between the inspection station IS and the pipe elevator PE to disconnect multi length pipe sections into single length pipe section for transportation to the supply deck.

Routes B, C1 and C5 are thus routes for single length pipe sections, and routes C2, C3 and C4 are routes for multi length pipe sections.

On the supply deck, single length pipe sections are transported from the pipe section storage PSS to the pipe elevator PE along routes A1 and A2. Between the pipe section storage PSS and the pipe elevator PE, a bevelling station BS is provided to prepare the single length pipe sections for joining. When single length pipe sections return to the supply deck SD by the pipe elevator PE, they can return to the pipe section storage PSS via route A3 or may return to the bevelling station BS via route A4 for another try. The bevelling station BS may also be located on the working deck. Single length pipe section will then travel from the pipe elevator PE to the bevelling station and then continue along either route C1 or route B to the respective preassembly line or assembly line.

Route A4 may be the inverse of route A2, and route A3 may be the inverse of route A1 and A2.

The pipe section storage PSS is in this example located on the vessel, but may also be located on another vessel.

Preferably, all routes are as short as possible, but more preferably at least the routes C4 and C5 are as short as possible, as is route B.

Figure 2:
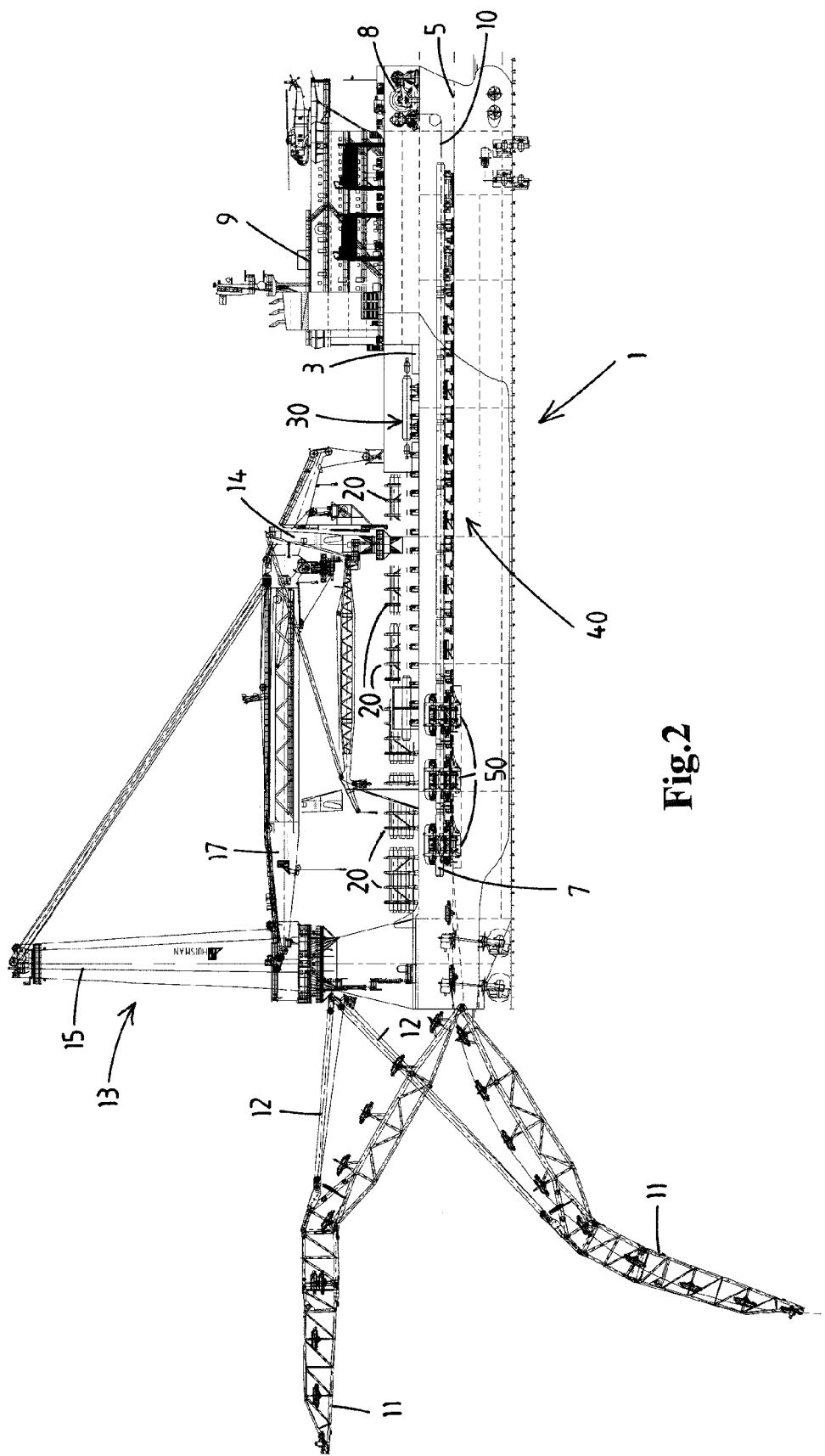
FIG. 2 shows a vessel according to an embodiment of the invention.

FIG. 2 shows an offshore pipelaying vessel 1 for laying a pipeline 7 on a seabed (not shown) according to an embodiment of the invention. The vessel 1 comprises a pipeline-laying installation, in this case of the S-lay type.

The vessel is provided with three tensioners 50 for carrying a weight of the pipeline hanging downwards from the rear side of the vessel, and a stinger 11 which is shown in two positions: a raised position and a lowered position. In the lowered position, the stinger is able to guide the pipeline towards the seabed. The raised position is convenient when no pipeline is laid.

The vessel 1 comprises a superstructure 9 at a front side of the vessel for crew accommodation. Extending from the superstructure towards a rear side of the vessel, a main deck 3 is provided. On this main deck 3 a hoisting crane 13 is located at the rear side of the vessel used to transport objects from and to the vessel, or to transport objects around the main deck. Shown on the main deck are racks 20 filled with single length pipe sections which act as a pipe section storage on the vessel.

The hoisting crane 13 comprises a hollow column 15 and a jib 17 attached to the column in such a way that the jib can be pivoted up and down and is able to revolve around the column. The stinger is attached to the column by cables 12, which can be hauled in or paid out to change the position of the stinger. The hoisting crane 13 is shown in a resting position.

The pipeline-laying installation comprises an assembly line 40 located on a working deck 5 in line with the tensioners 50, said assembly line having at least one pipeline assembly station to assemble the pipeline 7 to be launched from the vessel 1 by joining multi length or single length pipe sections end to end. The multi and/or single length pipe sections are transported from the pipe section storage on the main deck to the assembly line 40 by a conveyor system.

A preassembly line and an inspection station are located on the working deck as will be described in more detail with reference to FIG. 3. The conveyor system comprises a pipe elevator 30 to transport pipe sections between the main deck and the working deck, and is located near the front side of the vessel, close to the superstructure. The pipe elevator forms an entry-and-exit location of pipe sections for the working deck. The conveyor system is configured to allow transportation of multi and/or single length pipe sections along at least the following routes:

directly from the entry-and-exit location to the assembly line;

indirectly from the entry-and-exit location to the assembly line via the preassembly line and the inspection station;

from the entry-and-exit location to the preassembly line and the inspection station, and after passing the inspection station directly to the entry-and-exit location.

The pipe section storage may be situated on the main deck of the vessel, but can also be located on another vessel. Transportation of the pipe sections to the main deck is than provided by hoisting crane 13 or crane 14.

The pipeline 7 is launched from the vessel using an abandonment and recovery (A&R) system comprising an A&R winch 8, and an A&R cable 10 attachable to the pipeline 7 as is known in the art.

The pipeline-laying installation will now be described in more detail with respect to FIGS. 3 and 4.

Figure 3:
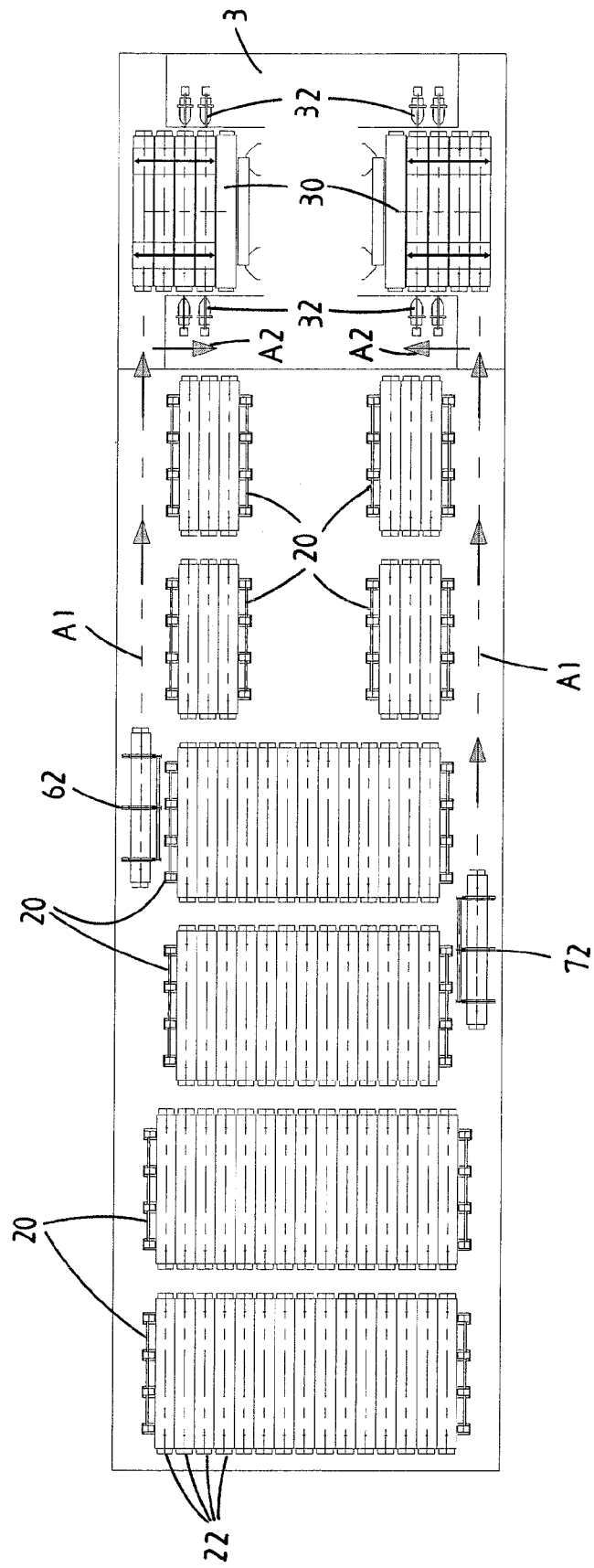
FIG. 3 shows a main deck of the vessel of FIG. 2.

FIG. 3 shows in detail a top view of a part of the main deck 3 of the vessel according to FIG. 2. Placed on the main deck are racks 20 with multiple pipe sections 22 on each rack 20.

Only a few pipe sections 22 are referred to by reference numeral 22. The racks 20 act thus as pipe section storage.

Figure 4:
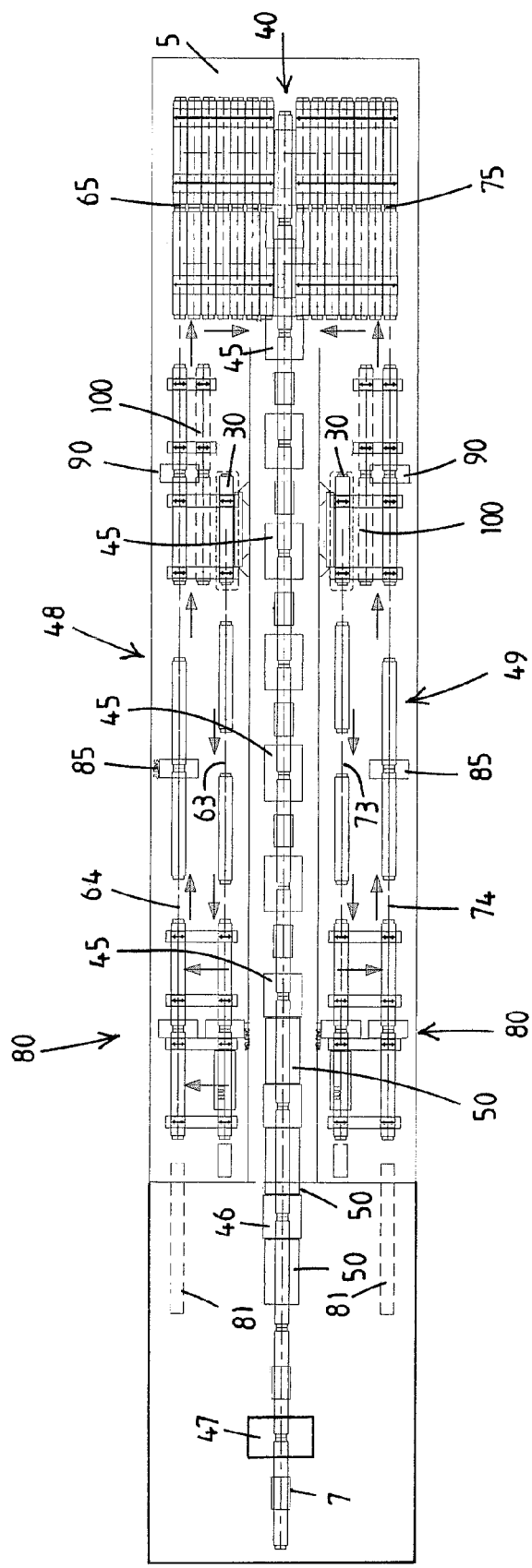
FIG. 4 shows a working deck of the vessel of FIG. 2.

The pipeline-laying installation comprises two conveyor systems for transporting pipe sections 22 from the pipe section storage 20 to the assembly line 40 on the working deck 5 which is shown in FIG. 4. Each conveyor system has a corresponding pipe elevator 30 located at a front side of the main deck 3 for transporting pipe sections 22 between the main deck 3 and the working deck 5.

On the main deck 3, each conveyor system comprises a respective starting unit 62,72, a respective conveyor route A1, and a respective route A2.

Pipe sections 22 will be placed on the starting unit 62 or 72, for instance by a crane on the vessel, or by a crane of another vessel when the pipe section storage is located on said other vessel, to begin their journey to the assembly line on the working deck. The conveyor routes A1 connect the respective starting units 62,72 with bevelling stations 32 for bevelling the ends of the pipe sections 22. The routes A2 connect the bevelling stations 32 with the pipe elevator 30.

Upstream of the pipe elevator, the routes A2 and a part of the route A1 have a transverse nature, i.e. the pipe sections are transported in a direction perpendicular to their longitudinal direction. In this transverse portion, there is the ability to store a few pipe sections 22 and in this case comprise the bevelling station 32 for easy access of the bevelling tools. Bevelling on the main deck and not on the working deck has the advantage that there is less hinder due to the sound the bevelling stations produce during bevelling.

The starting units 62,72 and the conveyor routes A1 are located on the sides of the main deck 3, which has the advantage that the centre of the main deck 3 is free for racks 20. This configuration makes therefore efficient use of the available space. It makes it also very easy for a crane of another vessel to transport pipe sections from said other vessel to the starting units.

The pipe elevators 30 are not placed in line with the conveyor routes A1, but are located towards the middle of the main deck, thereby making room for the transverse section and the bevelling stations.

The pipe elevators 30 are configured to transport a single length pipe section at a time, which saves space with respect to a pipe elevator configured to transport multi length pipe sections at a time.

FIG. 4 shows a part of the working deck 5 of the vessel according to FIG. 2. On the working deck 5 are located three tensioners 50 to carry the weight of a pipeline 7 to be launched. In line with the tensioners 50 is an assembly line 40 having multiple pipeline assembly stations. The pipeline assembly stations comprise joining stations 45 for joining pipe sections to form a pipeline 7. In this case, the pipeline assembly stations 45 are welding stations to weld pipe sections together. The pipeline assembly station may comprises other stations as well, such as an inspection station 46 to inspect the quality of the weld and a coating station 47 to coat the weld. Inspection of the welds is done in a non-destructive way (NDT).

Pipe sections 22 coming from the main deck 3 enter the working deck at pipe elevator 30, i.e. the entry-and-exit location. Extending from each pipe elevator 30 towards a rear side of the vessel, a respective preassembly line 48,49 is provided.

Each preassembly line comprises a first track 63,73 adjacent and parallel to the assembly line 40. At the end of the first track 63,73 a joining station 80 is provided for joining pipe sections together. In this embodiment, the joining station is a welding station, wherein an external weld is performed in the first track, the pipe sections are subsequently moved sideways to a second track 64,74 and an internal weld is performed by internal welding tool 81. The joined pipe sections, i.e. the multi length pipe section, are then moved towards the front side of the vessel along the second track until they reach an inspection station 90 adjacent the pipe elevator 30. between the joining station 80 and inspection station 90, an additional joining station 85 may be provided to perform an additional joining operation, such as an external welding.

Between the pipe elevator 30 and the joining station 80, a preheating station may be provided to preheat at least a part of the pipe sections. This preheating may be advantageous for the subsequent joining process in the joining station 80, e.g. for welding.

The inspection station 90 inspects the joints made by the joining stations 80, possibly 85, for leaks and structural integrity, i.e. the quality of the weld, e.g. using NDT technology. The joints are approved or rejected by the inspection station.

In case the joints are approved, the joint pipe section continues towards a transverse conveyor 65,75, which stores the joined pipe sections and transports them to the assembly line. In the assembly line, four pairs of joined pipe sections can be connected in pipeline assembly stations 45 at the same time to form a pipeline 7. These joints made by the assembly stations 45 may be inspected by corresponding inspection stations as well, and the joints may be coated. The one or more tensioners 50 serve to launch the pipeline.

In case the connected pipe sections are rejected, they are moved sideways to a disconnecting station 100. Disconnecting of the joined pipe sections is necessary as the pipe elevator 30 is, as is preferred, only capable of transporting single length pipe sections. After disconnecting of the joined pipe sections, the single length pipe sections can be individually transported back to the main deck 3, where they can be disposed or can be bevelled again and enter the working deck again via the pipe elevator 30.

It is also possible that single length pipe sections are transported from the pipe elevator to the assembly line directly via the disconnecting station 100 and inspection station 90, which in this case only act as conveyors, thereby providing an efficient route for the single length pipe sections.

The invention claimed is:

1. An offshore pipelaying vessel for laying a pipeline on a seabed, comprising a pipeline-laying installation having:
    a preassembly line with a joining station to form multi length pipe sections by joining single length pipe sections end to end;
    an inspection station associated with said preassembly line for inspecting joints made by the joining station of the preassembly line;
    an assembly line with a pipeline assembly station to assemble a pipeline to be launched from the vessel by joining multi and/or single length pipe sections end to end; and
    a conveyor system for transporting multi and single length pipe sections, said conveyor system comprising an entry-and-exit location,
    wherein the conveyor system is configured to allow transportation of multi and/or single length pipe sections at least along the following routes:
        a first route directly from the entry-and-exit location to the assembly line, wherein the preassembly line is not in the first route, such that the multi and/or single length pipe sections bypass the preassembly line;
        a second route indirectly from the entry-and-exit location to the assembly line via the preassembly line and said inspection station, wherein the preassembly line and the inspection station are in the second route; and a third route from the entry-and-exit location to the preassembly line and said inspection station, and after passing said inspection station directly to the entry-and-exit location, wherein the preassembly line is in the third route upstream of the inspection station, such that the multi and/or single length pipe sections bypass the preassembly after passing said inspection station.

2. The vessel according to claim 1, wherein the conveyor system comprises a pipe elevator for transporting a multi or single length pipe section between a supply deck and a working deck, the preassembly line, the inspection station, and the assembly line being located on the working deck, and wherein the pipe elevator is the entry-and-exit location.

3. The vessel according to claim 2, wherein the supply deck is an open, non-covered main deck located above the working deck.

4. The vessel according to claim 2, wherein the entry-and-exit location is located near a beginning of the assembly line.

5. The vessel according to claim 2, wherein downstream of the inspection station between the inspection station and the entry-and-exit location a disconnecting station is provided for disconnecting multi length pipe sections into single length pipe sections.

6. The vessel according to claim 2, wherein the conveyor system is arranged to transport multi and/or single length pipe sections between said inspection station and the entry-and-exit location in a direction perpendicular to a longitudinal direction of said multi and/or single length pipe sections.

7. The vessel according to claim 1, wherein the entry-and-exit location is located near a beginning of the assembly line.

8. The vessel according to claim 7, wherein downstream of the inspection station between the inspection station and the entry-and-exit location a disconnecting station is provided for disconnecting multi length pipe sections into single length pipe sections.

9. The vessel according to claim 7, wherein the conveyor system is arranged to transport multi and/or single length pipe sections between said inspection station and the entry-and-exit location in a direction perpendicular to a longitudinal direction of said multi and/or single length pipe sections.

10. The vessel according to claim 1, wherein downstream of the inspection station between the inspection station and the entry-and-exit location a disconnecting station is provided for disconnecting multi length pipe sections into single length pipe sections.

11. The vessel according to claim 1, wherein the conveyor system is arranged to transport multi and/or single length pipe sections between said inspection station and the entry-and-exit location in a direction perpendicular to a longitudinal direction of said multi and/or single length pipe sections.

12. The vessel according to claim 1, wherein the preassembly line is located adjacent and parallel to the assembly line.

13. The vessel according to claim 1, wherein the preassembly line extends from the entry-and-exit location in a direction corresponding to a direction in which the pipeline is launched from the vessel.

14. The vessel according to claim 1, wherein the preassembly line comprises a first track and a second track which is adjacent and parallel to the first track, and wherein the conveyor system is arranged to transport multi and/or single length pipe sections from the first track to the second track in a direction perpendicular to a longitudinal direction of said multi and/or single length pipe sections.

15. The vessel according to claim 1, wherein the pipeline-laying installation is of the S-lay type, and wherein the vessel includes a stinger aligned with the assembly line.

16. The vessel according to claim 1, wherein a further preassembly line, a further inspection station associated with said further preassembly line, and a further conveyor system are provided, said further conveyor system comprising a further entry-and-exit location, wherein the further conveyor system is configured to allow transportation of multi and/or single length pipe sections along the following routes:
a fourth route directly from the further entry-and-exit location to the assembly line, wherein the further preassembly line is not in the fourth route, such that the multi and/or single length pipe sections bypass the further preassembly line;
a fifth route indirectly from the further entry-and-exit location to the assembly line via the further preassembly line and the further inspection station, wherein the further preassembly line and the further inspection station are in the fifth route; and
a sixth route from the further entry-and-exit location to the further preassembly line and the further inspection station, and after passing the further inspection station directly to the further entry-and-exit location, wherein the further preassembly line is in the sixth route upstream of the further inspection station, such that the multi and/or single length pipe sections bypass the further preassembly after passing said further inspection station.

17. The vessel according to claim 16, wherein the preassembly line, inspection station and conveyor system are located on one side of the assembly line, and wherein the further preassembly line, the further inspection station, and the further conveyor system are located on the other side of the assembly line.

* * * * *